United States Patent Office 3,048,999
Patented Aug. 14, 1962

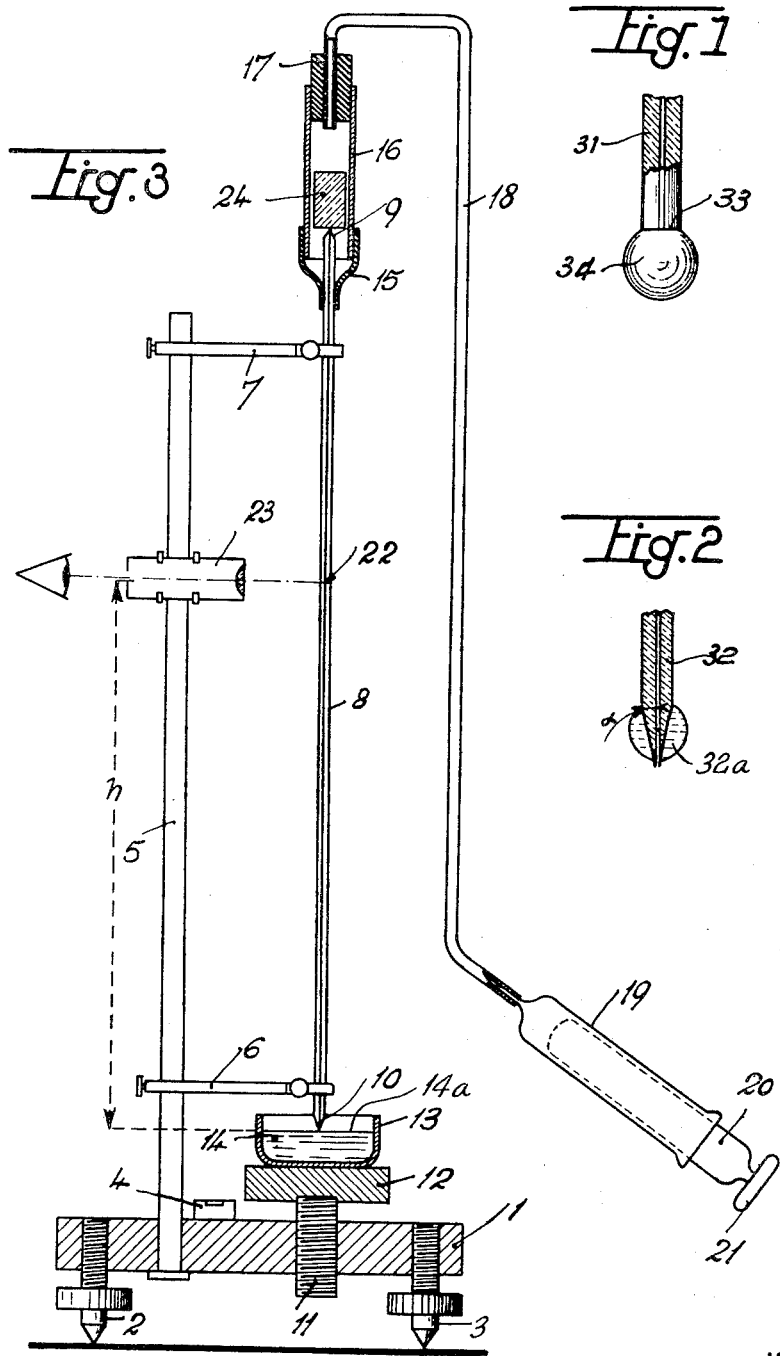

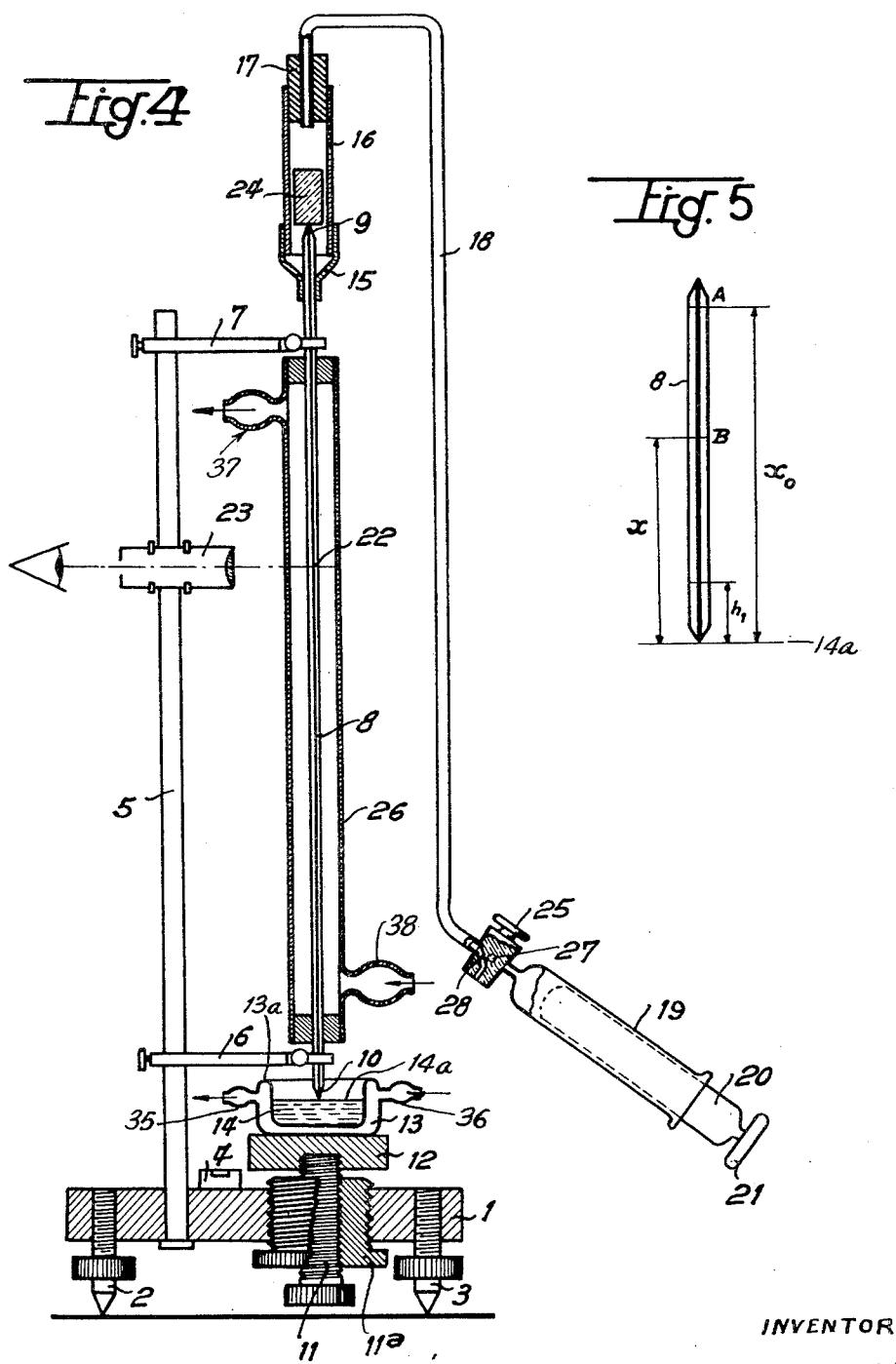

3,048,999
METHOD AND DEVICE FOR MEASURING SURFACE TENSIONS AND VISCOSITIES
André Pélissier Robert Pochan, 29 Rue de Houilles, Montesson, France
Filed Apr. 17, 1959, Ser. No. 807,143
Claims priority, application France Nov. 21, 1952
9 Claims. (Cl. 73—54)

The present invention relates to devices for determining the surface tension and absolute viscosity of liquids and is a continuation-in-part of my copending patent application Serial No. 393,481, filed November 20, 1953 now abandoned.

An object of this invention is to provide a device of this kind which is adapted to give the true surface tension and absolute viscosity in a particularly simple and prompt manner.

Another object of this invention is to provide a device of this kind which is adapted to give the surface tension and absolute viscosity using an exceedingly small volume of the liquid to be tested.

A further object of this invention is to provide a device comprising a capillary test tube capable of being used in a large number of successive tests, in contradistinction with known arrangements wherein the capillary test tube is used only once.

Still a further object of this invention is to provide an instrument of this class which gives particularly accurate values of the surface tension and absolute viscosity of a liquid.

With the above and other objects in view, the invention consists of the improved device and method as set forth in the appended claims and all equivalents thereof.

FIGS. 1 and 2 are fragmentary illustrative views respectively of two forms of capillary tube, one having a flat annular terminal surface, and the other having a conical end.

FIG. 3 shows, partly in section, an embodiment of an apparatus according to the present invention.

FIG. 4 is a view of another embodiment.

FIG. 5 is a schematic view of the apparatus showing its use for the determination of absolute viscosity.

The method and device of this invention are based on the following constatations and experiments of the applicant.

It should be recalled that the only basic method of measuring surface tension is that using the rise of liquids in capillary tubes and that all the theory of the rise of liquids in capillary tubes rests on two fundamental postulates, which are:

(1) That every liquid mass assumes an external form such that its volume will be enveloped by a surface of minimum extent;

(2) That the nature of the walls of the capillary tube is without influence on the height of the rise of the liquid.

But the first of these two postulates is wrong as a drop of a liquid which is in contact with the surface of a solid or of another liquid can spread itself out to form a monomolecular film if the cohesion of said first liquid is lower than the attraction of the molecules of the solid or of the second liquid.

The second postulate is also unreliable. It is well known that only an infinitesimal trace of grease is sufficient to alter the results. Moreover the experiments of the applicant show that, with walls of vinyl chloride, water does not rise but is depressed and behaves like mercury in contact with glass walls. With tubes made with certain samples of Plexiglas, alcohol rises higher than water while it has been considered up to now that its surface tension is about three times lower. The same experiments show that the form of the meniscus is quite different according to the nature of the material constituting the walls. The second postulate is consequently erroneous.

It is consequently clear that the theory of capillarity now recognized is not proper and specially that it cannot explain the ovoidal form of the drop.

Another experimental observation shows the non-accuracy of the theory upon which the law of Jurin is based. The law of Jurin states that the height of a capillary column of a liquid at a particular temperature is inversely proportional to the diameter of the tube, or more specifically that $$h = \frac{2t \cos K}{dga}$$

where $t$ is the surface tension, $K$ is the angle of contact with the capillary, and $d$ is the liquid density. It is recognized that this law is not strictly true. When the lower conical end of a capillary tube is exactly set into contact with the surface of a liquid, the latter rises in the tube up to a height $h_1$. If the contact is now broken between the conical end of the capillary tube and the surface of the liquid, there is a further rise of the liquid in the tube and the height of the column of liquid in the tube becomes $h_2$. Said experimental observations are summarized in the following table:

| Liquid | Temper., ° Cent. | Density=$d$ | $h_1$ | $h_2$ | $h_2-h_1$ | $\gamma=0.343475\,dh_1^{mm}$ $\sigma=0.343475\,d(h_2-h_1)$ | | |
|---|---|---|---|---|---|---|---|---|
| | | | | | | $\gamma=F-\sigma$ | $\sigma$ | $F=\gamma+\sigma$ |
| | | | Mm. | Mm. | Mm. | Dynes | Dynes | Dynes |
| Water | 15°5 | 1.000 | 213.3 | 228.0 | 11.7 | 73.264 | 5.048 | 78.312 |
| Ethyl-alcohol 95° | 11° | 0.800 | 86.3 | 92.0 | 5.7 | 23.714 | 1.566 | 25.280 |
| Ethyl-oxide | 10° | 0.730 | 73.3 | 78.0 | 4.7 | 18.379 | 1.179 | 19.558 |
| Benzene | 16° | 0.882 | 87.7 | 90.2 | 2.5 | 26.568 | 0.757 | 27.326 |
| Benzine | 16° | 0.720 | 83.0 | 86.5 | 3.5 | 20.526 | 0.866 | 21.392 |
| Dimethylformamide | 14°2 | 0.954 | 114.4 | 121.5 | 7.1 | 37.486 | 2.327 | 39.813 |

All these experimental data, which are not explainable by the recognized theories, find an accurate explanation if it is considered, according to the applicant's theory, that the force $\gamma$ which causes the rise of the liquid in the tube is the difference between the Newtonian force of attraction between solid and liquid, F, and the force of cohesion $\sigma$ of the liquid (true surface tension) which is the same as the Newtonian forces of attraction between molecules of the liquid $$\gamma = F - \sigma$$

If $F > \sigma$ there is a rise (wetting liquids)
If $F < \sigma$ there is a depression (non-wetting liquids).

But a correct figure is obtained for $h_2$ only if the contact is actually broken with any portion of liquid not contained in the tube, that is to say only if there is no hanging drop of liquid at the lower end of the test tube.

This is a considerable difficulty the applicant has solved following his observations that a liquid rises on the external face of a capillary tube the end of which is conical.

With such test tube the drop is ovoid and located above the said end of the tube. This is evidenced by FIGS. 1 and 2.

In these figures, are shown two different shapes of capillary tubes, 31 and 32, made of the same material; the lower end of the tube 31 is a flat annular surface 33 perpendicular to the axis of the tube (FIG. 1) and the lower end of tube 32 is a cone the vertex angle α of which is preferably lower than 10°. If a drop of the liquid contained in the tubes is allowed to form as shown at 34 in FIG. 1, it will take the form of a spheroid, if tube 31 is considered, until it falls when its weight is sufficient; in the case of tube 32, the drop 32a assumes first an ovoid form and raises along the external conical end of the tube, this end being 2 mm. below the drop; it is only when the weight of the liquid is sufficient to cause the drop to fall that the latter assumes a spheroidal form.

From the above, it is obvious that considerably more accurate data are obtained for the "capillary suction" γ computed from the law of Jurin where use is made of a conically ended capillary tube, and that the value of σ (molecular attraction or cohesion of the liquids) and of F (Newtonian attraction of the liquid by the capillary tube) can only be obtained by means of such a conically ended capillary tube.

This is achieved and accurate data are obtained by this invention which provides a capillary tube the lower end of which is conical.

In the embodiment of FIG. 3, this instrument includes a support or base 1 carried by three screws forming feet therefor, as shown at 2 and 3, and the screwing and unscrewing thereof with reference to the support 1 permit bringing the latter into a perfectly horizontal plane, to be indicated by a level 4. Said support 1 has a vertical rod 5 fixedly mounted thereon which is provided with two clips 6 and 7 holding a transparent capillary tube 8 in a perfectly vertical position. This capillary tube is calibrated and carries a scale of millimeters or of inches. As shown in the drawing, the ends 9 and 10 of said tube 8 have a conical shape tapering to a point. The angle of this end cone is advantageously less than 10°. Capillary tube 8 preferably has a constant inner diameter of its bore.

Within the support 1, there is formed a threaded opening through which is screwed a vertical micrometric screw 11, the upper end of which fixedly supports a plate 12 adapted to be raised or lowered with reference to said support by the vertical movements of said micrometric screw which movements are made with a very high degree of accuracy. Said plate 12 carries a container 13 for the liquid 14 the surface tension of which is to be measured.

The upper end of the capillary tube 8 is outwardly capped by a resilient sleeve 15 having the shape of a funnel. Inside the upper end of sleeve 15 is inserted one end of a sleeve or a tube or chamber 16 of a larger diameter and whose upper end is closed by a resilient stopper 17 made of rubber for instance. Through the stopper 17 passes a pipe 18 connected with suitable suction means. In the embodiment illustrated, the suction means is provided by a form of syringe including a cylinder 19 inside which a piston 20 is adapted to slide with said piston being controlled by the knob 21 formed thereon.

The instrument described operates in the following manner: A suitable amount of a liquid 14 is poured into the container 13 and the screw 11 is rotated so as to raise or lower the plate 12 into a position such that the free level 14a of said liquid is exactly in register with the tip of the lower conically tapering part 10 of the capillary tube 8. At this moment, the knob 21 is, with piston 20, drawn manually outwardly of cylinder 19 which produces a suction inside the tubes 18 and 16 and consequently also inside the capillary tube 8, which leads to a rise of the liquid 14 into and upwardly inside the tube 8.

It is then possible to reduce the suction by providing means for the entrance of air at atmospheric pressure through any suitable means, for instance by removing the stopper 17. The liquid level inside the capillary tube 8 will then drop but is stabilized at a predetermined level 22. The height separating said level 22 from the level 14a of the liquid 14 inside the container 13 is proportional to the surface tension and inversely proportional to the specific weight of the liquid.

The reading of the liquid level 22 is performed by the operator using a reading telescope 23 free from parallax of any type known per se, which is secured in any suitable manner to the rod 5, for instance by means of clips. The liquid level 22 is at a height $h$ above the level 14a of the liquid 14 in container 13 and graduated tube 8.

Now, if the designations are used:

$h$ the height of the column of liquid inside the tube 8 above level 14a, $d$ the specific weight of the liquid at the temperature of operation, $k$ the constant individual to the instrument, said constant being defined by experimenting with a liquid of known properties, the capillary suction γ which it is desired to ascertain is given in dynes/sq. cm. by the formula $\gamma = k.h.d$.

Obviously, for a reading of the liquid level in the tube 8, the lower conical end 10 of the tube 8 should be brought with a great accuracy into position flush with the free level 14a of the liquid 14 inside the container 13. To obtain such accuracy, the plate 12 is, as shown, vertically movable through operation of the micrometric screw 11.

The cleaning of the tube 8 which formed, hitherto, a practically insoluble problem in the operation of all prior known such instruments is performed with great ease in my improved instrument. It is sufficient in fact to pour into the container 13 a detergent liquid of which a suitable amount is sucked into the tube 8 through the suction means 10, and then distilled water is drawn in its turn in the same manner into the tube 8 so as to rinse the latter, and finally pure alcohol is sucked, again in the same manner, into the tube 8 so as to dry it. These different liquids may be easily removed through absorption at the upper end of the tube 8 by reason of the extremely small volume of said tube. It is possible to resort to this end, e.g. to a plug 24 of absorbent material housed inside the larger tube 16 and adapted to rest on the upper conical end of the tube 8, without this having any detrimental action on the operation of the instrument.

Very accurate observed values can be obtained when use is made of the modified form of apparatus shown in FIG. 4, where parts corresponding to those shown in FIG. 3 are designated by like references. A complete description of this apparatus is not necessary as it is the same as the apparatus of FIG. 3 except for the following features:

The container 13 is provided with a double wall and the capillary tube is provided with a jacket 26 so that a thermostatic medium can be circulated to maintain the liquid to be tested at a constant temperature through ports 35, 36, and 37, 38, respectively.

The micrometric screw 11 is screwed in a threaded piece 11a which is in turn screwed in the threaded opening provided in the support 1. This arrangement allows for an accurate contact of the conical end of the capillary tube 8 with the surface of the liquid.

Moreover there is provided in FIG. 4 a cock 25 which provides a communication between the capillary tube 8 and the cylinder 19 through the diametral duct 27 in one position, and between this tube 8 and the atmosphere through duct 28 in a position at a right angle as shown in the drawing.

The value of the capillary suction, as obtained by means of one or the other of the above described apparatus of FIG. 3 or FIG. 4, is particularly accurate as the conical end of the capillary tube 8 minimizes the influence of the nature of the material constituting the tube and of the external meniscus between the tube and the liquid, on the reading of the zero of the measurement scale.

If it is desired to obtain the true absolute surface tension, the apparatus can be operated as follows: The height $h$ or $h_1$ of level 22 above level 14a is first determined as indicated herein before; then, the screw 11 is unscrewed so as to break the contact between the conical lower end of the capillary tube 8 and the surface of the liquid so as to measure the supplemental rise of the liquid by measuring the height $h_2$ reached by this liquid inside the capillary tube 8 above level 14a. The end of the tube being conical and this end not having been immersed in the liquid, there is a very little amount of liquid outside the capillary tube and, as explained with reference to FIG. 2, this minor amount rises along the exterior surface of the capillary tube 8. An accurate value of height $h_2$ above level 14a is consequently obtained. From the data so obtained, there is computed the apparent surface tension $\gamma$ and the true surface tension $\sigma$ by the following formulae:

$$\gamma = k d h_1$$

$$\sigma = k d (h_2 - h_1)$$

in which $d$ is the density of the liquid and $k$ a constant of the apparatus.

As is clear from the above, it is quite essential that the lower end of the capillary tube be conical: it is the only way to secure a sharp contact between the tube and the surface of the liquid, thus permitting an accurate measurement of $h_1$ and avoiding the immersion of the tube; if a non-conically ended tube is but slightly immersed before separation from the liquid, there is formed a hanging spheroidal drop as shown at 34 in FIG. 1 and the column of liquid inside the tube is never separated from the exterior liquid; then the supplementary rise as described is prevented or its value is at least altered.

With one or the other of the two forms of apparatus described, for FIG. 3 and FIG. 4 it is easy to obtain an accurate value of the interfacial tension between two liquids. The first liquid E whose density is lower, is first sucked into the capillary tube 8, the suction is reduced and the corresponding height $h_1$ above level 14a is read. The second liquid F is then sucked in to the capillary tube 8, without removing the liquid E; if $h'_1$ is the new height of the first liquid E above level 14a and $\delta_1$ its density $h_2$ is the height of second liquid F and $\delta_2$ its density $k$ the constant corresponding to the tube $= gD/4$ $\gamma iE/F$ the interfacial tension of first liquid E with respect to second liquid F; we have $$\gamma iE/F = k[h_2\delta_2 - \delta_1(h_1 - h'_1)]$$

These forms of apparatus are also particularly useful when it is required to determine the absolute viscosity of a liquid. Until now, the known apparatus for measuring the viscosity from the gravity flowing of the liquid and which are of the Ostwald, Baume or similar types, give only comparative values of the viscosity, the basis of comparison being generally water or glycerol. They are not adapted to give an absolute value of the viscosity because the law of Poiseuille does not apply to tubes the inner diameter of which is not constant.

$$Q = \frac{\pi P a^4}{8 l Z}$$

Where Q is the rate of flow, P is the pressure difference between two points a distance $l$ apart in the line of flow, $a$ is the constant tube radius and $z$ is the viscosity of the liquid.

As the applicant's tube has a constant inner diameter, said law can be made use of and the following formula gives the absolute viscosity of the tested liquid $$\eta = \frac{D^2 g}{32} \frac{\delta t}{(x_0 - x) - 2.3026 h_1 \log \frac{x - h_1}{x_0 - h_1}}$$

In the formula $\eta$ = dynamic viscosity (poises).

$D$ = diameter of the tube (cm.).

$\delta$ = specific gravity of the liquid.

$t$ = flowing time (sec.).

$h_1$ = height of the liquid in the tube above level 14a after stabilisation (capillary suction).

$x_0$ = height of the column of liquid above level 14a at the beginning of the test.

$x$ = height of the column of liquid at the end of the test.

In using the apparatus of FIG. 3 or FIG. 4 to measure absolute viscosity, as shown by FIG. 5, the height $h_1$, corresponding to the surface tension, is determined as indicated hereinbefore; the liquid is then sucked until it reaches the point A, and $x_0$ is read on the millimetric scale on the tube 8; then the liquid is allowed to flow until it reaches the point B and the time interval duration $t$ of the flowing is noted. During these operations, the conical lower end of the tube 8 just contacts the free surface level 14a of the liquid in the container.

As the viscosity is subjected to considerable changes of value according to the temperature, it is particularly useful to make use of the apparatus of FIG. 4 which has thermostatic jackets.

In another way of using one or the other of the above described forms of apparatus, they may be employed using two different liquids to determine the density of a first liquid under test, as an application of the determination of interfacial tensions, even if only few cu. mm. of said liquid are available. Use is made of an auxiliary second liquid unmiscible with the first liquid.

The two liquids G and H are successively selectively sucked into the capillary test-tube, by means of the sucking device and the suction is reduced. If $x$ is the density of the first liquid, $\delta$ the density of second liquid, $\gamma i$ $G/H$ the interfacial tension between the two liquids, $h_1$ and $h_2$ the respective heights of these liquids above level 14a and $k$ the constant of the test tube:

$$\gamma G + \gamma iG/H = k(h_1 x + h_2 \delta)$$

The operation is repeated after having sucked out a part of the first liquid which is absorbed by the plug 24, the lower end of the test-tube remaining into contact with the second liquid. If $h'_1$ and $h'_2$ are the new respective heights of the liquids:

$$\gamma G + \gamma iG/H = k(h'_1 x + h'_2 \delta)$$

hence $$h_1 x + h_2 \delta = h'_1 x + h'_2 \delta$$

and $$x = \delta \frac{h'_2 - h_2}{h_1 - h'_1}$$

What I claim is:

1. The method of measuring the surface tension of a liquid contained in a vertically displaceable container using a vertical substantially straight capillary tube having a conically tapered lower end which consists in bringing into precise contact the lower end of said tube and the surface of the liquid, aspirating the upper end of the tube to draw liquid from said container up into the tube, then admitting air at the upper end of the tube and allowing the liquid in the tube to drop to an equilibrium position, and measuring the height of the column of liquid in the tube above the surface of the liquid in the container.

2. The method of measuring the true surface tension of a liquid contained in an adjustably vertically displaceable container using a vertical capillary tube having a conically tapered lower end which consists in bringing into precise contact the lower end of said tube and the surface of the liquid, aspirating the upper end of the tube to draw liquid from said container up into the tube, then admitting air at the upper end of the tube and allowing the liquid in the tube to drop to an equilibrium position, measuring the height of the column of liquid in the tube above the surface of the liquid in the container, breaking the contact between the surface of the liquid and the lower end of the tube, measuring the resultant supplemental rise of the liquid in the capillary tube whereby the true surface tension of the liquid can be determined from said supplemental rise.

3. The method of measuring the interfacial tension of two different liquids using a vertical capillary tube having a conically tapered lower end which consists in bringing into precise contact the lower end of said tube and the surface of the first liquid of lower density, aspirating the upper end of the tube to draw liquid from said container up into the tube, then admitting air at the upper end of the tube and allowing the liquid in the tube to drop to an equilibrium position, measuring the height of the column of liquid in the tube above the surface of the liquid in the container, bringing into precise contact the lower end of the same capillary tube and the surface of the second liquid, reaspirating the upper end of the tube to draw the second liquid up into the tube, admitting air at the upper end of the tube and allowing the liquids in the tube to drop to an equilibrium position whereby the interfacial tension can be determined from the observed height of the first liquid alone, and its observed height in the presence of the second liquid, and the observed height of the second liquid.

4. A device for use in measuring in absolute values the surface tension and the viscosity of a liquid, comprising a support, a substantially vertical rod mounted on said support, a transparent capillary tube of a constant inner diameter throughout its entire length from tip to tip and provided with conical ends carried vertically by said rod and having its conical lower end tapering downwardly to a point, a plate, means for finely adjusting the position of said plate relative to said tube lower end, a container for the liquid to be examined carried by said plate, a cylindrical expansion connecting chamber whose diameter is larger than that of said capillary tube mounted above the latter, means connecting said capillary tube fluid-tightly with said large diameter chamber, suction means having a suction applying end, a pipe opening into the suction end of said suction means, detachable means fluid-tightly connecting said last mentioned pipe with the upper end of said large diameter chamber, and said capillary tube having scale markings extending longitudinally therealong measured from the lower point of said tube.

5. A device for use in measuring in absolute values the surface tension and the viscosity of a liquid, comprising a support, a substantially vertical rod mounted on said support, a transparent capillary tube of a constant inner diameter throughout its entire length and provided with conical ends carried vertically by said rod, a plate, means for finely adjusting the position of said plate relative to the lowermost end of said tube, a container for the liquid to be examined carried by said plate for bringing the level of said fluid into horizontal registration with the lower apex of said capillary tube, a chamber the diameter of which is larger than that of said capillary tube mounted over the latter, means connecting said capillary tube fluid-tightly with said large diameter chamber, suction means having a suction applying end, a pipe opening into the suction end of said suction means, detachable means fluid-tightly connecting said last mentioned pipe with the upper end of said larger diameter chamber, means for measuring the height of the liquid inside said tube above the level of the liquid inside said container, and a plug of absorbent material housed in said larger diameter chamber and resting freely over the upper conical apex of said capillary tube.

6. A device for use in measuring in absolute values the surface tension and the viscosity of a liquid comprising a support, a substantially vertical rod mounted on said support, a transparent capillary tube of a constant inner diameter throughout its entire length from tip to tip, and provided with conical ends carried vertically by said rod and having its conical lower end tapering downwardly to a sharp end, a thermostatic jacket surrounding said capillary tube, a plate, means for accurately adjusting the position of said plate axially relative to the lower end of said tube, a container for the liquid to be examined carried by said plate, a cylindrical chamber the diameter of which is larger than that of the capillary tube mounted over the upper end of said tube, means connecting said capillary tube fluid-tightly with said larger diameter chamber, suction means having a suction applying end, a pipe opening into the suction and of said suction means, detachable means fluid-tightly connecting said last mentioned pipe with the upper end of said large diameter chamber, and means for measuring the height of said liquid inside said tube above the level of the liquid inside said container.

7. A device according to claim 4, said means for finely adjusting said plate comprising a threaded sleeve screwed into an aperture in said support and further comprising a bolt threadedly engaged in the inside of said sleeve and carrying said plate.

8. A device according to claim 4, and a first thermostatic jacket surrounding said capillary tube, and a second thermostatic jacket surrounding said container, and means for circulating fluid of a constant temperature from an external source through said jackets.

9. A device according to claim 4, said tube being provided with a numerical scale of graduations having the zero graduation at the lower end of said tube.

References Cited in the file of this patent

UNITED STATES PATENTS

| | | |
|---|---|---|
| 1,960,224 | Schoenberg | May 22, 1934 |
| 2,398,737 | Elliot et al. | Apr. 16, 1946 |
| 2,540,360 | Ulvild | Feb. 6, 1951 |

FOREIGN PATENTS

| | | |
|---|---|---|
| 690,051 | France | June 10, 1930 |
| 775,672 | France | Oct. 15, 1934 |
| 172,592 | Austria | Mar. 15, 1952 |

OTHER REFERENCES

Text: Practical Physical Chemistry, Findlay, 5th edition pages 82–84.

Elementary Treatise on Physics by Ganot, published in 1898, page 119. (Copy in Div. 36, U.S. Patent Office.)